(12) United States Patent
Malamut et al.

(10) Patent No.: US 12,106,120 B2
(45) Date of Patent: Oct. 1, 2024

(54) SELF-HEALING DATA PROTECTION SYSTEM AUTOMATICALLY DETERMINING ATTRIBUTES FOR MATCHING TO RELEVANT SCRIPTS

(71) Applicant: Dell Products L.P., Round Rock, TX (US)

(72) Inventors: Mark Malamut, Aliso Viejo, CA (US); Adam Brenner, Mission Viejo, CA (US); Arun Murti, Mission Viejo, CA (US)

(73) Assignee: Dell Products L.P., Hopkinton, MA (US)

( * ) Notice: Subject to any disclaimer, the term of this patent is extended or adjusted under 35 U.S.C. 154(b) by 125 days.

(21) Appl. No.: 18/075,773

(22) Filed: Dec. 6, 2022

(65) Prior Publication Data

US 2024/0134657 A1    Apr. 25, 2024

Related U.S. Application Data

(63) Continuation-in-part of application No. 17/971,167, filed on Oct. 21, 2022, which is a continuation-in-part of application No. 17/955,802, filed on Sep. 29, 2022.

(51) Int. Cl.
*G06F 9/445* (2018.01)
*G06F 11/07* (2006.01)

(52) U.S. Cl.
CPC ...... *G06F 9/44505* (2013.01); *G06F 11/0793* (2013.01)

(58) Field of Classification Search
CPC .......................... G06F 9/44505; G06F 11/0793
See application file for complete search history.

(56) References Cited

U.S. PATENT DOCUMENTS

| | | | |
|---|---|---|---|
| 9,015,527 B2* | 4/2015 | Mohanta | G06F 11/1469 714/6.3 |
| 9,600,487 B1 | 3/2017 | Pandian | |
| 10,007,535 B1 | 6/2018 | Chopra | |
| 2003/0074247 A1 | 4/2003 | Dick | |
| 2004/0025143 A1* | 2/2004 | Bhogal | G06F 8/75 717/115 |
| 2005/0262472 A1 | 11/2005 | Wood | |
| 2007/0157174 A1 | 7/2007 | Gebhardt | |
| 2009/0265681 A1* | 10/2009 | Beto | G06F 11/3688 717/100 |

(Continued)

*Primary Examiner* — Etienne P Leroux
(74) *Attorney, Agent, or Firm* — Staniford Tomita LLP

(57) ABSTRACT

Embodiments help timely remediation of issues in a data protection system by automatically evaluating scripts configured to address the issues. The system has a bounded list of possible attributes that are deemed important by system administrators. Each attribute is assigned a System Impact Score (SIS) along a defined scale. A self-healing processing component monitors the state of each attribute over time. The scripts are evaluated through repeated execution and use of the attribute monitoring to determine which attributes are affected by a script. Weights are assigned to each attribute affected by a script to aid in the selection of scripts most likely to remediate an actionable issue. Regularly performing script evaluation and attribute weighting allows for updating of scripts with an accurate list of attributes to overcome problems associated with manual updates.

20 Claims, 8 Drawing Sheets

(56) References Cited

U.S. PATENT DOCUMENTS

| | | | |
|---|---|---|---|
| 2011/0060945 A1* | 3/2011 | Leprince | G06F 11/2294 |
| | | | 713/1 |
| 2012/0213347 A1* | 8/2012 | Rosenberg | H04L 65/1096 |
| | | | 379/93.02 |
| 2018/0143750 A1 | 5/2018 | Ye | |
| 2018/0260122 A1* | 9/2018 | Kazi | H04L 67/1097 |
| 2018/0275989 A1 | 9/2018 | Kakkad | |
| 2018/0287955 A1 | 10/2018 | Fitzgerald | |
| 2018/0316780 A1 | 11/2018 | Baird | |
| 2019/0065990 A1* | 2/2019 | Sharma | G06N 5/04 |
| 2021/0019243 A1 | 1/2021 | Hickey | |
| 2021/0248260 A1 | 8/2021 | Adkins | |
| 2021/0365519 A1 | 11/2021 | Newton | |

* cited by examiner

| NAME 802 | alphanumeric | |
|---|---|---|
| DESCRIPTION 804 | phrase | |
| CATEGORY 806 | Metric<br>State<br>Ordered Value | Min/Max values<br>possible values<br>increasing scale |
| DATA SOURCE 808 | REST API<br>CLI | URL, actions, I/Os<br>command, options, outputs |
| MONITOR INTERVAL 810 | in seconds | |

| Attribute 1054 | SIS | R1 (H) | R1 (L) | R2 (H) | R2 (L) | R3 (H) | R3 (L) |
|---|---|---|---|---|---|---|---|
| Storage Capacity | 10 | 80 | 77 | 77 | 74 | 74 | 70 |
| CPU Usage | 5 | 97 | 92 | 94 | 88 | 95 | 86 |
| ... | | ... | ... | ... | | ... | |
| Storage Unit Count | 2 | 32 | 32 | 32 | 31 | 31 | 31 |

SELF-HEALING DATA PROTECTION SYSTEM AUTOMATICALLY DETERMINING ATTRIBUTES FOR MATCHING TO RELEVANT SCRIPTS

CROSS-REFERENCE TO RELATED APPLICATIONS

This application is a Continuation-In-Part application and claims priority to U.S. patent application Ser. No. 17/971,167 filed on Oct. 21, 2022 and entitled "Self-Healing Data Protection System Matching System Attributes to Relevant Scripts Using Multiple Scripts," which in turn is a Continuation-In-Part application and claims priority to U.S. patent application Ser. No. 17/955,802 filed on Sep. 29, 2022 and entitled "Self-Healing Data Protection System Matching System Attributes to Relevant Scripts Using Weighted Attributes," which in turn is a Continuation-In-Part application and claims priority to U.S. patent application Ser. No. 17/874,868 filed on Jul. 27, 2022 and entitled "Self-Healing Data Protection System Matching System Attributes in Alert Messages to Relevant Scripts," which are both assigned to the assignee of the present application, and which is hereby incorporated by reference in its entirety.

TECHNICAL FIELD

Embodiments are generally directed to data protection systems, and more specifically to matching failed operations to remedial scripts without causing side effects.

BACKGROUND

Large-scale data protection systems, such as cloud data protection systems backup and restore large amounts of data from large numbers of different and disparate backup clients. Established products, such as the PowerProtect Data Manager system from DellEMC provided software defined data protection, automated discovery, deduplication, and IT governance for physical, virtual, and cloud environments. When provided as a business or enterprise platform, such systems may support many clients and customers with different data backup and processing needs. During typical usage deployments, it is common for certain users to encounter problems or issues with data backups or restores. Current troubleshooting of issues within current data protection consoles and systems often requires a user to call technical support personnel to provide guidance or fix these issues. Such a technical support or IT group may maintain a large database of known issues and their corresponding potential solutions.

Many systems utilize scripts or macros that can address and automatically solve many issues that may be encountered in a system. However, such scripts may also affect other parts of the system besides the element causing or associated with the issue. In this case, simply executing a likely relevant script may create additional issues.

What is needed, therefore, is a system and method automatically and timely addresses issues through a process that matches failed operations to scripts that are most likely to fix a problem without causing other issues or side effects.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and PowerProtect Data Manager are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
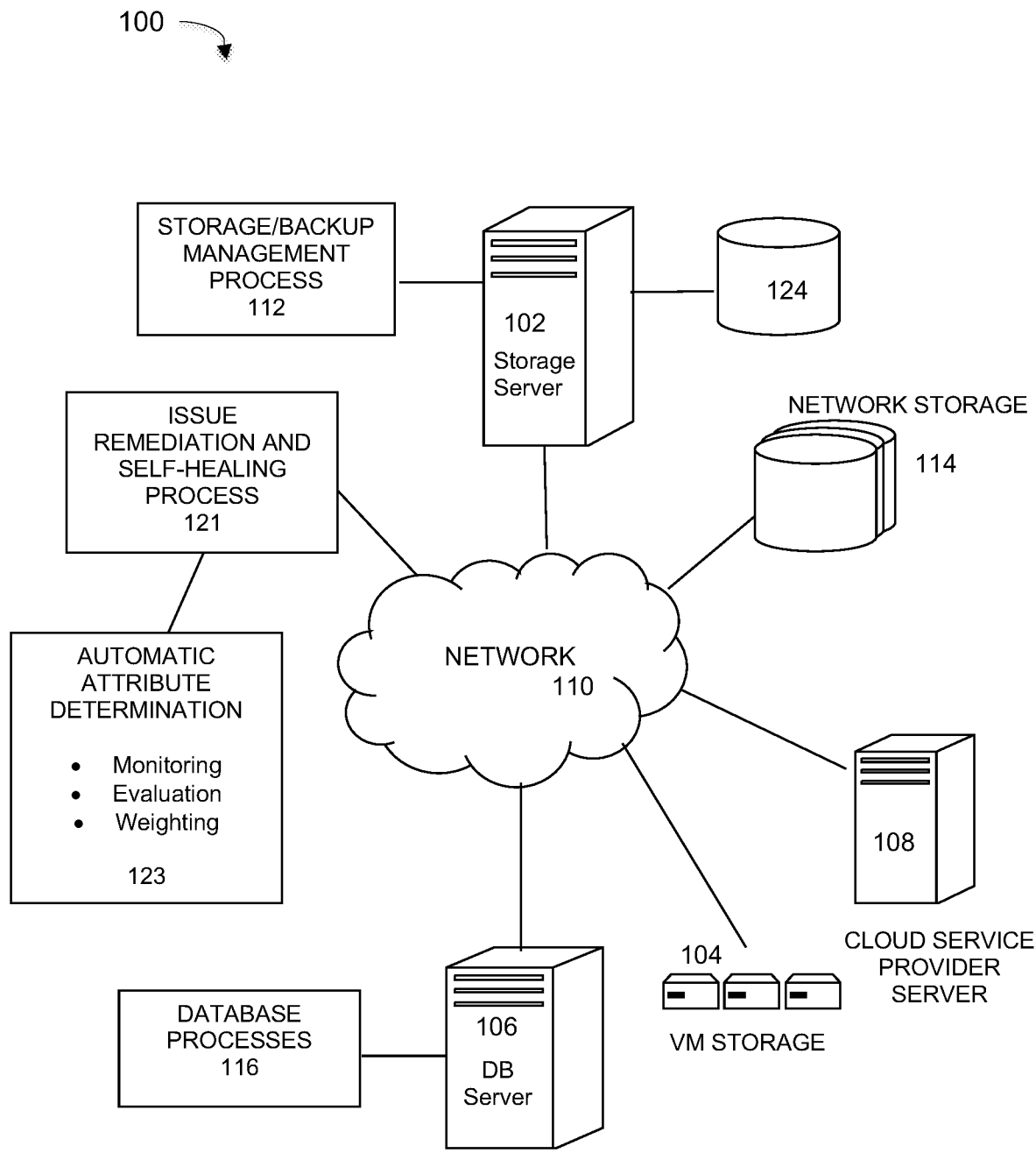
FIG. 1 is a diagram of a data protection system implementing a self-healing process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

As stated above, fixing user issues in present large-scale data protection systems can often require extensive person-to-person interaction between users and tech support personnel. Embodiments reduce the need for such manual and human-based interaction by providing a data protection console that is itself directly connected to a support remediation knowledge database so that it could leverage a wide range of current console metrics to identify reasons for an issue. Once a source of the issue has been identified, automated script execution processes will implement the proposed fix by running scripts within the user environment to perform self-healing of the system.

Some embodiments of the invention involve data processing and storage in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a method to provide automatic diagnosis and self-healing or remediation of data processing problems in a data protection system. FIG. 1 illustrates a data protection system that implements a self-healing process under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 maybe a database server executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP) 108. The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays.

In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible. In general, Data Domain is a purpose-built backup appliance providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays. Data Domain has a logical extension to its file system and MTree organization which allows a data movement policy to be applied to aging backup content.

Deduplication backup systems, such as the DellEMC Data Domain system use deduplication techniques as a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data.

In an embodiment, the deduplication backup system 100 of FIG. 1 is implemented as part of a comprehensive data protection platform, such as the Dell EMC PowerProtect data manager system. This data manager system represents a next generation data management system that provides trusted data protection for workloads and file systems running on-premises with self-service capabilities for operational efficiency and IT governance controls to ensure compliance. SaaS-based management interfaces are provided to easily monitor, analyze and troubleshoot distributed data protection environments.

Figure 2:
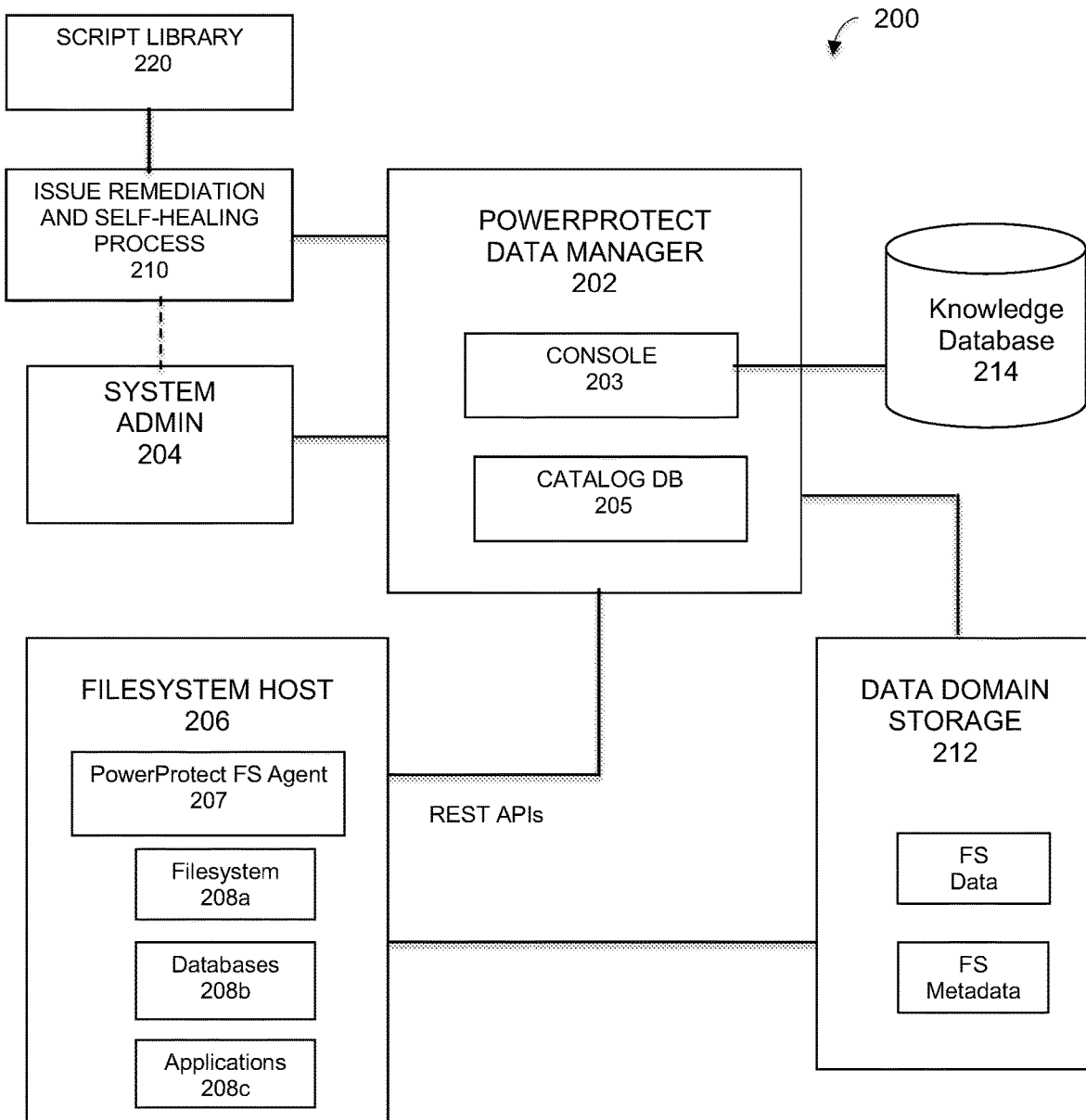
FIG. 2 illustrates a PowerProtect data manager system that implements a self-healing process, under some embodiments.

FIG. 2 illustrates a PowerProtect data manager system that implements a self-healing process, under some embodiments. In system 200, the data manager component 202 provides ability to discover, manage, monitor data protection and replication for filesystem assets, such as provided or accessed by filesystem host 206 through integration the file system agent 207. Filesystem assets, such as filesystems 208*a*, databases 208*b*, applications 208*c*, and any other relevant data are protected in with system with centralized and self-service file system protection features. The data manager 202 enables a user, such as system (or IT) admin staff 204 to perform backup and restore using certain self-service CLI (command line interface) workflows for Windows and Linux (or similar) assets.

Data is backed up from and restored to the data sources from storage (e.g., Data Domain appliances) 212, which stores filesystem data and metadata. The data manager is configured to support various levels of data backups, such as block-based and file-based filesystem support for different operating systems, e.g., Windows (NTFS, ReFS) and Linux (Ext3, Ext4 and XFS), etc. It also provides centralized filesystem backup and recovery (volume and file level), as well as centralized file level restores of block-based file system backups.

In an embodiment, the data manager 202 provides a console 203 including a graphical user interface (GUI) component that allows users to set protection policies, perform backup and recovery operations, deduplicate workloads and file systems, and so on. Filesystem backup configuration can be done by a backup administrator 204 through protection lifecycle policies set on the data manager 202. At the time of a scheduled backup, the data manager 202 requests the filesystem agent 207 to perform a save operation for filesystem data. The filesystem agent parses the backup job request and converts the request into appropriate (e.g., ddfssv) utility commands and performs the save operation. The filesystem agent 207 creates/verifies the storage unit on the storage media 212. 5. Upon successful verification, the filesystem agent writes the file system data directly to the storage unit and sends the catalog details to catalog database 205 in the data manager 202. Other operations, such as data restores, replication, and so on, can be performed similarly in system 200.

The data manager system can be deployed as a stand-alone system, integrated appliance form factor, or in an Amazon Web Services (AWS) or similar system to protect in-cloud workloads. It can be configured to protect a variety of databases, Kubernetes container environments, VMware applications on-premises and in the cloud, as well as Windows NTFS and Linux filesystems. Although embodiments are described with respect to a Dell EMC PowerProtect Data Manager system, it should be noted embodiments are not so limited, and any similar data protection system may be used.

As stated above, any issues that arise with respect to data backup, restores, or other processing operations must typically be manually handled by the user and/or system administrator 204 through some form of personal interaction. For the embodiment of FIG. 2, system 200 includes an issue remediation and self-healing process 210 that provides a direct interface between the console 203 and a support remediation knowledge database 214 that allows the data manager 202 to leverage a wide range of current console metrics to pinpoint the reason for an issue, and institute automatic remedial or corrective (fix) measures to address the current issue.

System 200 also includes scripts that are written and deployed to automatically perform certain tasks involving system resources and backup operations. Such scripts (also called macros) are sequences of program code that are automatically executed when triggered and generally execute without user interaction.

Embodiments of system 200 include a describes a process 121 that automates the timely remediation of issues by matching failed operations to a script that is configured to fix the problem or problems without causing additional side effects, thus minimizing unavailability of services/data and loss of data.

As shown in FIG. 2, the data protection system 200 includes in an instance of backup software, such as implemented by the PowerProtect Data Manager 202, and one or more instances of protection storage 212, such as a PowerProtect Data Domain appliance. These elements run backup operations that will either succeed or fail. Example operations include backup data from a backup client to the storage, restore data from the storage to the client, and migrate data among storage and/or clients.

The system 200 has a set of attributes that are affected by operations. Attributes include backup client ID, storage unit ID, storage unit type, protected data type, backup policies, and so on. For example: when a backup operation runs, data is stored on a 'storageUnit' that has a specific 'deviceType'. Attributes can include, but are not limited to the following: (1) storage utilization, (2) CPU utilization, (3) device status (online/offline/locked), and (4) storage unit status (non-existent/full/unavailable), and other similar parameters.

Each system operation (e.g., backup, GC, restore, etc.) has a list of associated attributes, such as listed above. This list of attributes per operation are assigned by the vendor and stored in knowledge database 214, or other similar location. When an operation fails, process 210 executes. Operations that fail can generate alerts that show the system attributes affected by the operation. In an embodiment, either or both of the data manager 202 and storage 212 are configured to detect issues related to a currently executed backup operation. Once an issue is detected by either component, it will issue an appropriate alert message.

The alerts comprise text or graphical messages transmitted to the user through the GUI, or through another appropriate notification method. An alert may be provided in the following format (or equivalent): "attribute1=A attribute2=B [ ... ]." For example: "Error: storage not found deviceType=DD storageUnit=ImportantData." This provides a list of attributes per operation. Each script has a list of attribute and a weight.

Component 210 of system 200 includes a self-healing service (SHS) that implements a process operates on scripts that are acted on by the data protection system. In an embodiment, script library 220 contains scripts that are provided in any appropriate format, such as, Python script, bash shell script, etc. The scripts are written and stored for use by various possible entities or sources in the system, such as engineering personnel, technical support, administrators, etc.

The scripts contain information about the system attribute or attributes that it affects, and may contain this information in a header or other similar data element. For example: a Python script called createMissingStorageUnit.py has the line "#attributes: deviceType, storageUnit."

The scripts are stored in a library 220 that is accessible to the data protection system such that the SHS can read and execute the scripts and the scripts can connect to and operate upon the PPDM 202 software and storage 212. For example, the script library can be located in a directory within an NFS file share. In general, the library 220 is not public or made publicly available so that it can contain sensitive information (login tokens, etc.). Alternatively, a portion may be made public for scripts that operate on non-sensitive information that may be needed for third party or outside use.

Figure 3:
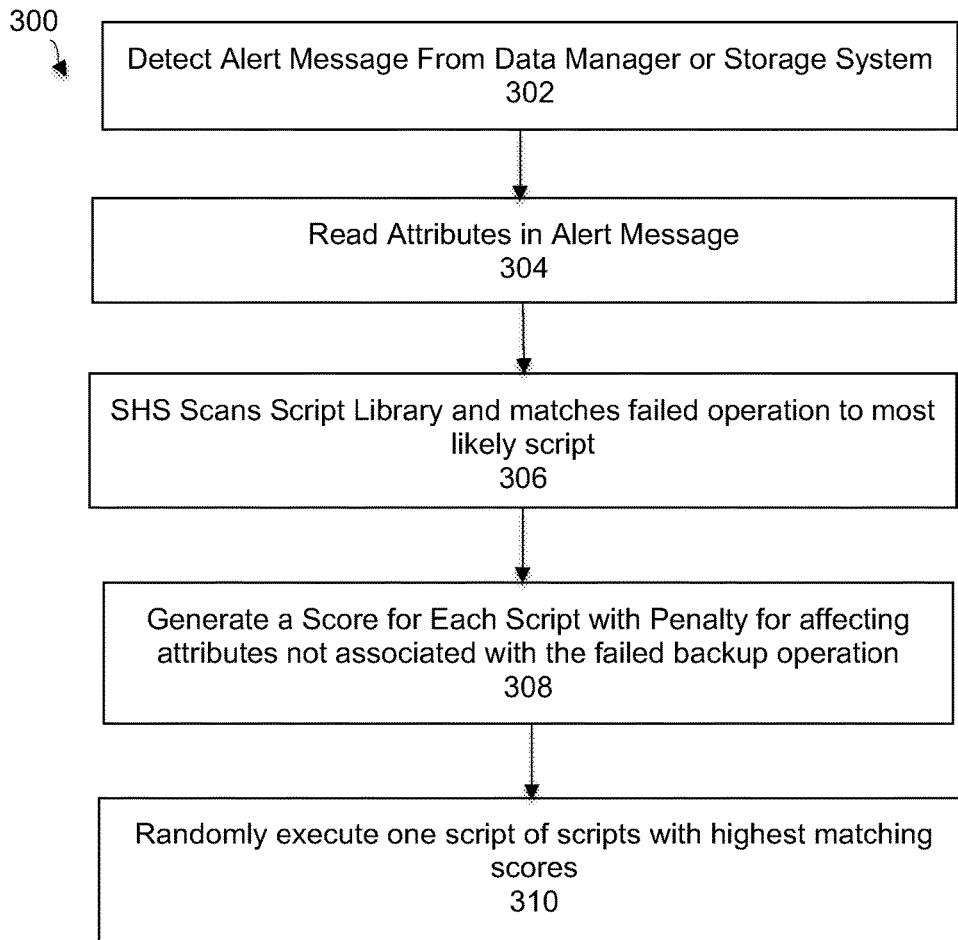
FIG. 3 is a flowchart that illustrates a method of processing an issue alert using a self-healing service (SHS), under some embodiment.
Figure 4:
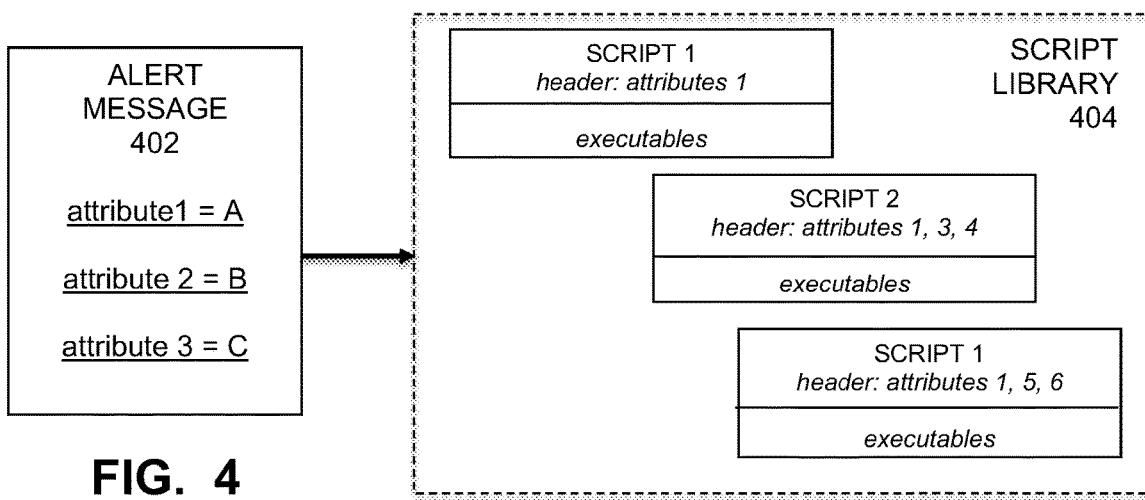
FIG. 4 illustrates a matching operation of alert messages to scripts in an example embodiment.

FIG. 3 is a flowchart that illustrates a method of processing an issue alert using a self-healing service (SHS), under some embodiment. The data manager or storage system will issue an alert for a failed operation, and this will be detected by the self-healing process 210 and SHS. Upon detection of such an alert, the SHS reads the attributes in the alert message, 304, and scans through the script library 220 and matches the failed operation to one or more scripts that are most likely to address or fix the issue without causing additional problems or side effects. In an embodiment, this is done by matching the attributes in the headers of all scripts to the attributes shown in the system attributes elements of the alert message. FIG. 4 illustrates a matching operation of alert messages to scripts in an example embodiment. As shown in FIG. 4, an alert message 402 contains a number of attributes, and these are matched to attributes in the headers of scripts (e.g., Script 1, 2, 3) in the script library 404. This is thus is a match of attributes in an operation against the set of operations in each script to compute a score as described below.

The SHS then generates a score for each script that is found to match or most likely match the alert message, 308. In an embodiment, the score is calculated using the following Equation 1:

$$Score=((M/N)-(U*P))*100 \quad \text{[Equation 1]}$$

In this equation:
N=number of attributes in the operation,
M=number of attributes in the script that also exist in the operation
U=number of attributes in the script that do not also exist in the operation
P=configurable penalty value (default=0.05)

The range of P is configurable, though it is typically much less than 1.0. The closer that the ratio (M/N) is to 1, the more likely the script is to be relevant to the operation, since the script will affect more of the attributes associated with the operation. If a script also affects attributes that are not associated with the operation, then it will have side effects on the system, which add risk of causing other problems by running that script. Therefore, each of those additional attributes add a penalty that reduces the likelihood of running the script. Once all the scores have been calculated the SHS executes the script with the highest score factoring in the penalties for scripts that affect attributes not associated with the operation, 310. In the event that two or more scripts are tied for the highest score, the SHS chooses one at random to execute, 310.

To illustrate this process 300, the following three example operations are provided. In this example:

Operation 1 has 4 Attributes, and Script A affects 4 Attributes, which all match Operation 1's Attributes; no other scripts match more than 3 Attributes, so Script A gets a Score of 100 and is run.

Operation 2 has 3 Attributes, and Script B affects 3 Attributes, which all match Operation 2's Attributes; however, Script B also affects 20 other Attributes 4 Script B gets a Score of 0 and is not run.

Operation 3 has 5 Attributes; Script C affects 4 Attributes, 3 of which match Operation 3's; Script D affects 3 Attributes, all of which match Operation 3's 4 Script D has a higher Score than Script C and Script D is run.

In an embodiment, certain remediation measures may be implemented. Some may be performed automatically, while others may require approval or human intervention. In an embodiment, the highest scoring script automatically performs the corrective or remediation process. This is typically done for less critical actions that can be taken automatically.

Occasionally, however solutions that are critical or drastic may require human awareness or approval may need extra processing besides automatic script execution. In this case, the system can notify the user with an option to implement the proposed solution (e.g., what worked last time and the option to initiate one of those options). An example of an action that would require human approval would be when a storage target is full, in which case, the solution may be to create more room by either a) running garbage collection and re-trying the backup, b) adding more storage, c) adjusting (e.g., shortening) retention times, or d) offloading some assets to another storage target. Some actions may be beyond the scope of the system administrator to implement (e.g., an operating system issue versus a backup issue). In such a case, the solution may be to direct the user to other personnel or provide documentation, and so on. This kind of solution might help mitigate the majority of solvable issues in a user environment, which will drive down tech support calls and increase customer satisfaction.

Weighted Attributes

In an embodiment, the attributes are weighted so that some attributes may be categorized and processed in a hierarchical order where some attributes are deemed more "important" than other attributes. The scripts can define which attributes have weights and how much they are weighted, and an updated ZAP formula includes weights in its calculations. The purpose of having weighted attributes is to help influence the overall algorithm to better determine which script should be used to resolve a particular problem.

As described above, and with reference to FIG. 2, system 200 implementing self-healing process 210 comprises an instance of backup software (e.g., PowerProtect Data Manager 202) and one or more instances of protection storage (e.g., PowerProtect DD storage 212). This system executes a software or storage related operation, which either succeeds or fails, and there are a set of attributes that are affected by these operations. For example, when a backup runs, data is stored on a 'storageUnit' on storage with a 'deviceType.' Operations that fail generate alerts that show the system attributes affected by the operation in the format "attribute1=A attribute2=B [ . . . ]." For example: "Error: storage unit full deviceType=DD storageUnit=ImportantData." The self-healing process 210 runs as a process within the Backup Software or as an independent entity.

As shown in FIG. 4, the system includes a script library 404 that stores a set of scripts that, when executed, act upon the data protection system 200. There is no strict prescription for a specific script format, which can be, for example, Python script, bash shell script, etc., nor the authors or source of the script (e.g., Engineering, Technical Support, etc.). However, the scripts are required to contain information with a specified format in its header about the system attributes that it affects. For example: a Python script called createMissingStorageUnit.py has the line:

attributes: deviceType [50], storageUnit [50]

In this embodiment, the attributes are weighted by a weight value provided as a numerical value after the attribute name, as in AttributeName [W], where 'W' is the weighting factor provided as a percentage value between 0 to 100. Thus, for the example above, [50] represents that the specific attribute has a weight of 50%, in this case both attributes are weighted 50%.

The sum of all the attributes' weights in a script must equal 100, and can be set to any appropriate percentage value per attribute. The attributes and the weights are pre-defined in the script by the author who is assumed to be a subject matter expert, and each operation lists the attributes affected, wherein the list is created by the vendor.

The scripts are stored in a location, such as the script library 220, which is accessible to the data protection system such that the self-healing process 210 can read and execute the scripts and the scripts can connect to and operate upon the backup software 202 and storage 212. For example, the scripts can be stored in a directory within an network filesystem (NFS) file share. In general, the library is not public, and can therefore contain sensitive information (e.g., login tokens, etc.). In cases where the library is not in a secure site, or is public, such sensitive information should not be contained therein, however, users can define library access privileges and data storage types depending on their needs.

Figure 5:
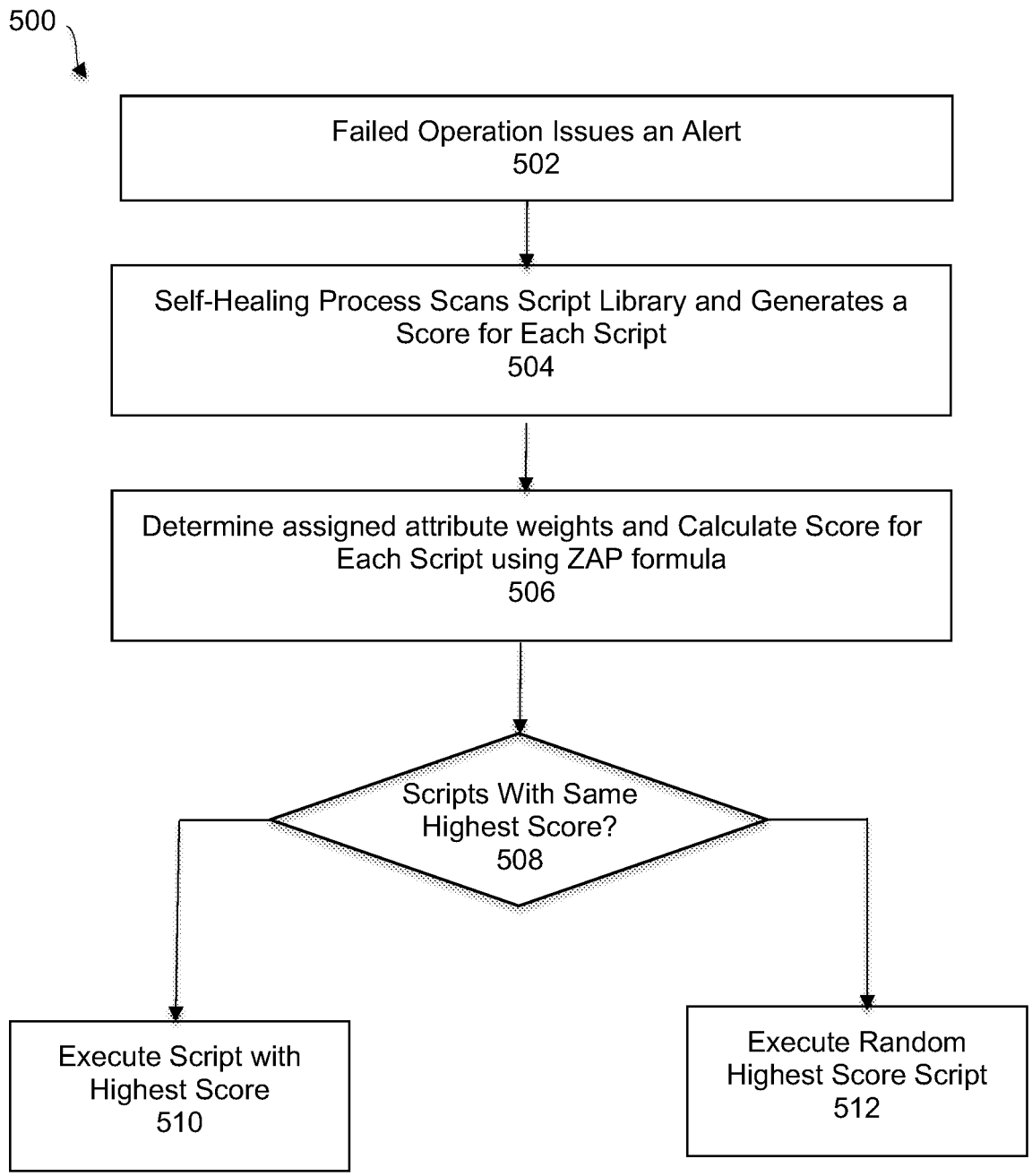
FIG. 5 is a flowchart illustrating a process of issuing an alert through a self-healing process using weighted attributes in scripts, under some embodiments.

FIG. 5 is a flowchart illustrating a process of issuing an alert through a self-healing process using weighted attributes in scripts, under some embodiments. As shown in FIG. 5, process 500 begins with a failed operation issuing an alert, 502. Upon this event, the self-healing process scans through the script library and generates a score for each script, 504. In an embodiment, this score is calculated using the following formula, named the 'ZAP' formula:

$$Score = Z - (A * P)$$

In the above ZAP formula:
Z=the sum of all the weight values for each attribute in the script that also exists in the operation;
A=the sum of all the weight values for each attribute in the script that do not also exist in the operation; and
P=a configurable penalty value (default=0.05).

The score is calculated by determining or factoring in the weight values to derive the Z and A factors, 506. The score is then computed by multiplying the A and P factors and subtracting this product from the Z factor.

The closer the score is to 100, the more likely the script is to be relevant to the operation, since the script will affect more of the attributes associated with the operation.

If a script also affects attributes that are not associated with the operation, then it will have side effects on the system, which add risk of not actually fixing the problem. Therefore, each of those additional attributes add a penalty that reduces the likelihood of running the script. This is encapsulated by the penalty factor (P). As can be seen in the above formula, weight values for attributes that are not also in the operation (A) are multiplied by the penalty value (P), which reduces the overall score for higher penalty values and/or higher weight sums for attributes that do not also exist in the operation. In an embodiment, the default penalty multiplier is 0.05, but other values are also possible, but typically range from 0 to 0.1.

The risk referred to above is the risk that the wrong set of operations within a script will be executed on the remote system that are attempting to be fixed. For example, if there are two scripts A and B, where Script A has 5 attributes while Script B has 25 attributes, and the operation trying to run has failed has 6 attributes (1, 2, 3, 4, 5 and 6). Script A matches 5 of the 6 attributes while Script B matches 6 attributes but has an additional 19 it also looks out for. Based on the ZAP formula, even though Script B has more matches to the failed operation than Script A (6 matches vs 5 matches) the additional 19 attributes within Script B will lower the score. The risk again, is that Script B is most likely not the correct script to run and if ran, the risk is that it will not fix the problem.

In step, 508, the self-healing process executes the script with the highest score, 510. However, if two or more scripts are tied for the highest score, as determined in step 508, the self-healing process selects a script at random, 512.

The weighted attribute embodiment can be used in several different real-world use cases. One example case is a backup storage system (like PowerProtect DD) that is running out of storage or has reached 100% storage usage. The attributes for the operation that is running could be: disk usage and CPU usage. A few scripts in the script library have some or all the six attributes listed above. One such script may be called "Run Garbage Collection" which has the following five weighted attributes:

Disk Usage: 100%
CPU Usage: 0%
Memory Usage: 0%
Bandwidth Usage: 0%
Number of Active Connections: 0%

Another script may be called "Out of Memory Killer" which has the following weights:

Disk Usage: 10%
CPU Usage: 10%
Memory Usage: 80%
Bandwidth Usage: 0%
Number of Active Connections: 0%

When running the ZAP formula, it can be seen that the Run Garbage Collection script has a score of 100 while the Out of Memory Killer script has a score of 16. Therefore, Run Garbage Collection is picked to run.

Embodiments described above automate the timely remediation of issues via a process that matches failed operations to one or more scripts that are most likely to fix problems without causing additional side effects, thus minimizing unavailability of services and loss of data. Embodiments further include an enhancement to the single and multiple-script embodiments by also analyzing and scoring multiple script combinations in order to improve the likelihood of remediation. Through this process, single script scores and multiple script scores are computed and compared. The script or set of scripts with the highest score will then be executed by the self-healing process.

As described above, the self-healing process automates the timely remediation of issues that may cause data loss by matching failed operations to one or more scripts that are likely to fix problems without causing additional side effects. The process enables a failed operation to run successfully by executing the single script that is determined to be the most appropriate before re-running the failed operation. In an embodiment, multiple script combinations are analyzed and scored in order to improve the likelihood of remediation. For this embodiment, single script scores and multiple script scores are computed and compared, and the script or set of scripts with the highest score is executed by the self-healing process.

As described above, the self-healing process 121 runs as a process within the backup software 202 or as an independent process, and utilizes a script library 220 that stores a set of scripts that, when executed, act upon the data protection system. These scripts contain information with a specified format in its header about the system attributes that it affects and the weight per attribute in each script.

For example, a Python script called 'createMissingStorageUnit.py' affects two system attributes, and has a large effect (71%) on "deviceType" and a smaller effect (29%) "storageUnit." For this example, the script header would contain the following line to denote the attributes and their weights as follows, where the weights and attributes are manually assigned by the script author:

"#attributes: deviceType[71], storageUnit[29]"

The self-healing process 210 scores each script in relation to a failed operation to determine which script(s) have the highest likelihood of enabling the operation to be rerun successfully.

The process 210 scores each script or combination of scripts in relation to an operation that has failed. It uses the script or script combination that has the highest score to determine which script(s) to execute, where the goal is to execute these script(s) so that the system can successfully rerun the failed operation. Each operation has an identified set of attributes that it uses or modifies, and each Script has an identified set of attributes that it modifies. A weight is associated with each attribute per script.

Figure 6:
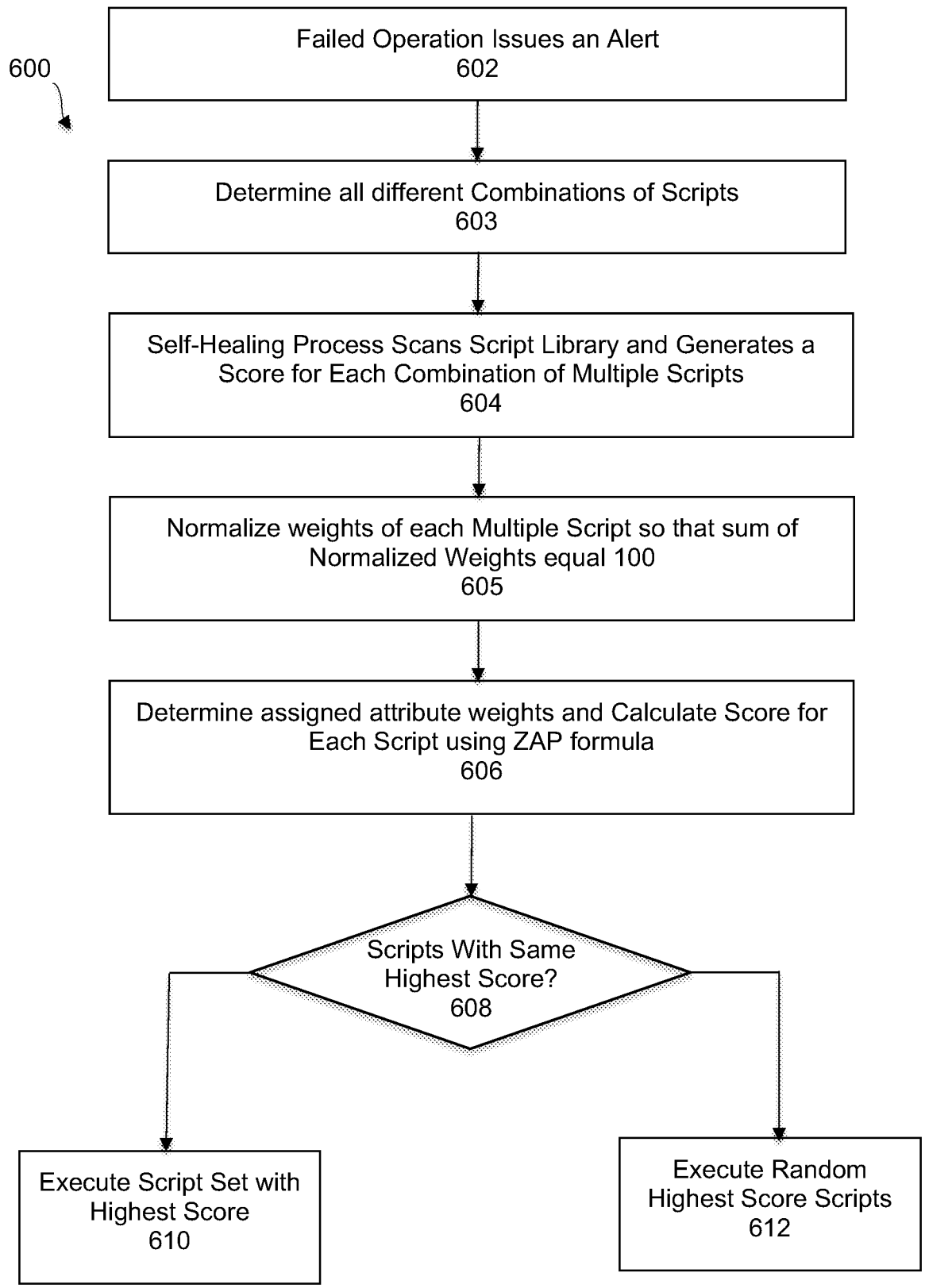
FIG. 6 is a flowchart illustrating a process of issuing an alert through a self-healing process using weighted attributes for multiple scripts, under some embodiments.

FIG. 6 is a flowchart illustrating a process of issuing an alert through a self-healing process using weighted attributes for multiple scripts, under some embodiments. As shown in process 600 of FIG. 6, when a failed operation issues an alert 602, the self-healing process 210 scans through the script library 220 and generates a score for each script individually and for each combination of scripts for multiple possible scripts 604. In this case, the process first determines all of the different combinations of scripts to generate sets of scripts, 603. For example, if there 3 scripts, there are 4 combinations (AB, AC, BC, ABC) of combined scripts in addition to the 3 individual scripts. Likewise, for 4 scripts, there are 11 combinations of unordered combined scripts in addition to the 4 individual scripts, and so on.

In an embodiment, the order of combined scripts does not matter so that executing script 1 before script 2 is the same as executing script 2 before script 1. For cases where the order of scripts does matter so that these two executions would yield different results, the execution order is not commutative (i.e., AB does not equal BA), and the number of possible combinations would increase, such as 3 scripts having 10 possible permutations: A, B, C, AB, BA, AC, CA, BC, CB, ABC (or 7 if the single script option is ignored).

Each attribute in each script has a weighting, which is proportional to how much the script affects each attribute. If an attribute weight is 42, that mean the script spends 42% of its effort to affect an attribute. To process these weights, the sum of the weights per script should always equal 100. However, when multiple scripts are scored, it is possible that the sum of the weights will not equal 100. In this case, the weights are modified using a normalization calculation so that the sum of the normalized weights equal 100, step 605. This normalization is necessary so that scores of single scripts and multiple scripts can be easily compared in order to find the script or scripts that have the highest likelihood of rectifying the error encountered by the operation.

Each script thus has a list of attributes and weights per attribute that the script affects, and the sum of all weights must always add up to 100, either with or without normalization. The score is the sum of the script attribute weights in common between the operation and scripts minus a penalty multiplier for each attribute weight that is in the scripts, and not in the operation, in accordance with the ZAP scoring formula given above, step 606.

The penalty factor (P) is applied to reduce the likelihood of undesired side effects, and if two or more scripts or script combinations are tied for the highest score, as determined in step 608, the process executes one at random, 612. Otherwise, the process executes the script or set of scripts with the highest score, 610.

An example is provided to illustrate calculations for processing multiple scripts, such as in process 600, as follows: assume there are five (5) total attributes across the entire system named A, B, C, D and E, which is a simplification for purposes of illustration since, in practice, 20 to 50 or more attributes may be defined. An Operation (Z) affects three attributes named A, B and D, and there are three scripts in the script library and each script is determined to affect the following attributes with the associated weighting:

Script 1 affects 4 attributes and are weighted such that A=42, B=0 (not affected), C=19, D=12, E=27;

Script 2 affects 5 attributes and are weighted such that A=15, B=21, C=31, D=20, E=13; and Script 3 affects 4 attributes and are weighted such that A=31, B=21, C=20, D=0 (not affected), E=28.

The Penalty factor for attributes affected by any script and are not part of an Operation (attributes C and E in this example) is applied. For this example, the default factor is 0.2.

Under single-script scoring (e.g., FIG. 5), the score for individual scripts is computed using the following formula. For each individual script, the score equals the sum of weights that also exist in the operation minus a configurable penalty value (default=0.2) for each attribute in the script that is not in the operation. The scoring here is computed as follows:

Score for applying Script 1 to Failed Operation
$Z=42+0+(19*(-0.2))+12+(27*(-0.2))=45;$ Score for applying Script 2 to Failed Operation
$Z=15+21+(31*(-0.2))+20+(13*(-0.2))=47;$ Score for applying Script 3 to Failed Operation
$Z=31+21+(20*(-0.2))+0+(28*(-0.2))=42.$ Therefore, in this example case considering only single scripts, process 500 would execute script 2 as it has the highest score of 47.

Under multiple-script scoring (e.g., FIG. 6), the score for each combination of scripts is computed. Using the three scripts shown previously, a score will be computed for the following combinations:

Script 1 and 2
Script 1 and 3
Script 2 and 3
Script 1, 2 and 3

Figures 7, 8:
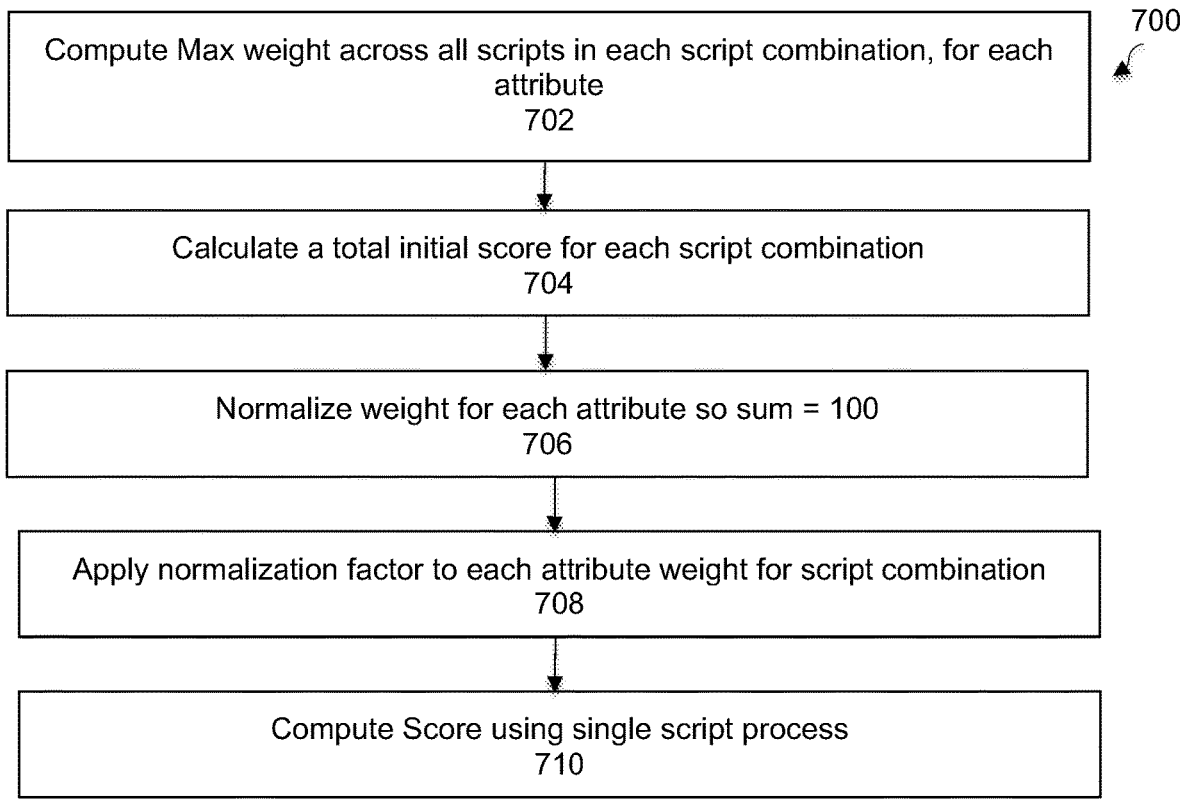
FIG. 7 is a flowchart that illustrates a process of calculating a score for multiple scripts, under some embodiments.
FIG. 8 is an example configuration file to specify attributes for use in a self-healing data protection system, under some embodiments.

The score for each combination (or set) of multiple scripts the process of FIG. 7 is used, where FIG. 7 is a flowchart that illustrates a process of calculating a score for multiple scripts, under some embodiments. Process 700 starts with computing, for each attribute, the maximum weight across all of the scripts in each script combination, 702. The process next calculates a total initial score is computed for each script combination, 704. The weight for each attribute is normalized so that the sum of weights for any script combination equals 100, 706. The process then applies the normalization factor to each attribute weight for the combination of scripts, 708. The normalized attribute weights are then used to a compute a score using the same formula as described above for a single script, i.e., score=sum of common attributes less sum of different attributes times penalty factor, 710. This process 700 repeats for each permutation or combination of the multiple scores, and the set of scripts with the highest score is selected to be executed. In an embodiment, the final scripts of the selected set of scripts may be executed in any order.

An example is provided to illustrate the operation of process 700 of FIG. 7 as follows: to compute the score across script 1 and script 2, for each attribute, the max weight across all of the scripts in each script combination is computed:

$A$: max(42,15)=42, $B$: max(0,21)=21, $C$: max(19, 31)= 31, $D$: max(12,20)=20, $E$: max(13,27)=27

The total initial score is computed for the script 1 and script 2 combination, so:

Script 1+script 2=42+21+31+20+27=141

Since the max score for any individual script is 100, the score for any script combination must also equal 100, so the weight for each attribute is normalized so that the sum of weights for any script combination is also 100. Using the previous example where the initial score is 141, a normalization factor of 100/141 (0.71) is applied to each initial attribute weight for this script. This factor is computed for each different combination of scripts.

Applying the normalization factor to each attribute weight for the combination of scripts 1 and 2 yields:

(42*0.71)+(21*0.71)+(31*0.71)+(20*0.71)+(27*0.71)

Normalized Weights: $A$=30, $B$=15, $C$=22, $D$=14, $E$=19 (Note, sum=100)

These normalized attribute weights are then used to a compute a score using the same formula as described previously for a single script (sum of common attributes less sum of different attributes times penalty factor). Here, the calculation yields:

Normalized score=30+15+(22*−0.2)+14+ (19*−0.2)=51

If the script library only contained script 1 and script 2, then this script combination would be executed by the self-healing process instead of any single script, as this score (51) is greater than the highest single script score which was 47 for script 2, in the single-script example given above.

In an embodiment, the calculation of scores for multiple scripts comprises first calculating the scores for each script individually (as a single script) per process 600, and then calculating the score of each set of scripts based on the different permutations of script combinations, e.g., [1, 2], [1, 3], [2, 3], [1, 2, 3] for three scripts, and so on. Once all of these scores are computed the script or script set with the highest score (or a random choice among co-highest) is selected to be run.

Alternatively, the single-script and multiple-script process can be executed in a single overall process that derives all possible script permutations for all scripts (i.e., n, n−1, n−2, n−3, and so on), and calculates the respective scores accordingly to determine the script or scripts to execute.

Though examples above described specific values of attribute weights, and so on, it should be noted that any other appropriate values may also be used. Similarly, any other application or use case with appropriate attributes, weights, and scripts may also be used in conjunction with the embodiments described herein.

In an embodiment, issues encountered in system 100 can be detected through the automatic detection process of self-healing process 121. In this case, the console could self-detect an issue when errors arise with system health and task completion. These automatically generated issues can be derived from logs, alerts, and system status events (e.g., a restore operation failed to run at the designated run time triggering error ARA0015)

Automatic Determination of Attributes

For the embodiments described above, it is necessary that the attributes associated with a script are pre-determined and tagged within the script by a human SME (Subject Matter Expert) or similar personnel/process. If the attributes are not properly tagged for a given script, then the self-healing system may not select the optimal script. This may be due to either an attribute of the system that the script claims to affect but does not actually affect will not resolve the issue, or an attribute that the script does affect but is not listed can cause unwanted side-effects. Furthermore, as the scripts and the system itself are updated during product development and testing, the attributes must be kept up-to-date through regular manual review and maintenance.

In an embodiment, system 100 includes an automatic attribute determination process 123 to keep the attributes up-to-date for the self-healing process 121 through certain attribute monitoring, script evaluation, and attribute weighting functions.

The overall data protection system 100 continues to have a bounded list of possible attributes, which are deemed important by the designers and implementers of the system. In an embodiment, each Attribute is assigned a System Impact Score (SIS), from a range of 1 to 10, with the maximum score (10) indicating that the attribute impacts a critical aspect of the system, such as total capacity, while a minimum score (1) indicates that the attribute impacts a minor aspect like the name of a storage unit. Any appropriate range may be used, and scores may be assigned based on known system characteristics, defined performance requirements, and so on.

As shown in FIG. 1, the SHS processing component 121 is also updated through process 123 with the following additional capabilities: attribute monitoring, which involves observing and recording the state of each attribute over time; script evaluation, which involves running a script and using attribute monitoring to determine which attributes are affected by the script; and attribute weighting, which involves determining the weights to assign to each attribute affected by the script to aid in the selection of scripts, as explained for the embodiments described above.

By automatically and regularly (e.g., daily or weekly) performing script evaluation and attribute weighting for the set of scripts in the script library 404, Scripts can be updated with an accurate list of attributes and their weights, thus overcoming any issues associated with manual updates.

Figure 9:
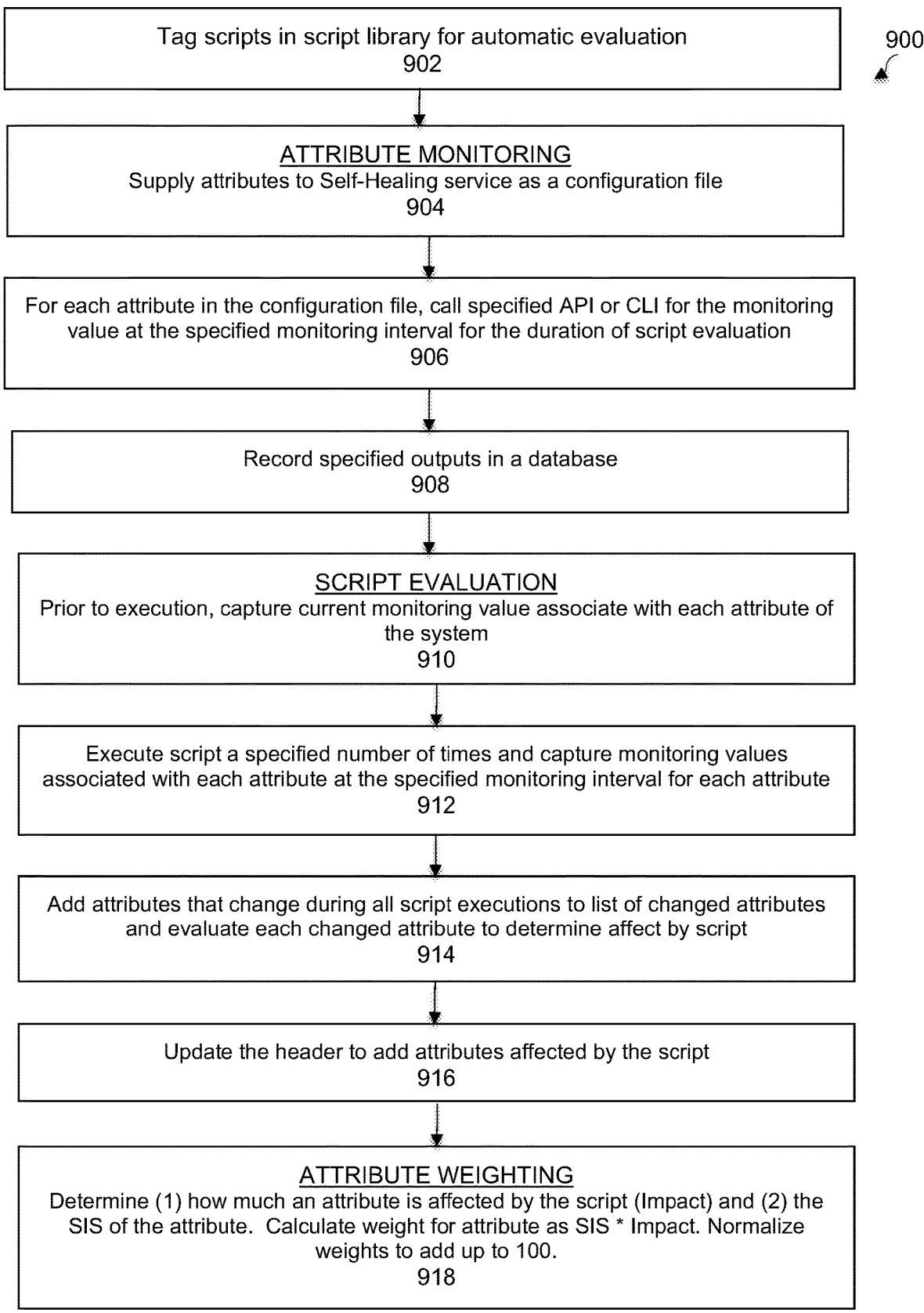
FIG. 9 is a flowchart that illustrates a method of automatically determining attributes in a self-healing data protection system, under some embodiments.

FIG. 9 is a flowchart that illustrates a method of automatically determining attributes in a self-healing data protection system, under some embodiments. Scripts are first tagged in the script library 404 for automatic evaluation or not, step 902. If a script is destructive and not important, then running it multiple times automatically may have adverse effects on the system. Thus, the system may be set to default to automatic script evaluation, unless an option is selected to not automatically evaluate a script.

After the scripts are tagged, the process 900 enters an attribute monitoring phase (steps 904-908). As part of this phase, a configuration file is used to supply the self-healing processing component 121 with the full list of attributes, step 904. FIG. 8 is an example configuration file to specify attributes for use in a self-healing data protection system, under some embodiments. As shown in table 800 of FIG. 8, the file includes information about each attribute including: attribute name 802, attribute description 804, category 806, data source for monitoring 808, and monitoring interval 810. The name 802 is a simple alphanumeric name of the attribute as selected by the user or set by the system, and the description 804 can be a simple text description or phrase about the attribute.

Attributes can be categorized based on different characteristics or properties. As shown in FIG. 8, the category 806 is either a metric value, a state, or an ordered value. The metric is a bounded numerical (scalar) value, and Min/Max values must be specified. For example, the storage capacity used, total storage capacity, number of storage partitions, and so on, all have certain set numerical values associated with each characteristic or property. The state is one of a fixed set of values indicating status, and a list of possible values must be specified. For example: service={up, down}, encryption_in_flight={None, SSL, TLS}, and so on. An ordered value is a set that has an inherent increasing value. The values are assumed to start at 0 and increase by 1. For example: severity={info, warning, error}.

The data source for monitoring value attribute 808 is either an API (application programming interface) or a CLI (command line interface). The API may be a REST API, but can also be another type of API, such as a GraphQL API. For a REST API, the URL, HTTP action, inputs, and outputs to filter, among other relevant parameters are also specified. For a CLI, commands, options, and outputs to filter are also specified.

The monitoring interval attribute 810 specifies the periodicity of the monitoring function in a certain unit of time, such as in seconds. A default value of 30 seconds (for example) may be set. Alternatively, this may be a user specifiable parameter.

As a second step in the attribute monitoring phase, for each attribute in the configuration file, the self-healing process calls the specified API or CLI for the monitoring value at the specified monitoring interval for the duration of the script evaluation process, 906. In a third step of the attribute monitoring phase, the specified outputs to filter are then recorded into a database (e.g., Postgres), step 908.

After the attribute monitoring phase, process 900 executes a script evaluation phase (steps 910-916). For this phase, prior to the script being executed, the self-healing process captures the current monitoring value associated with each attribute of the system, step 910. The script is the executed a specified number of times (e.g., default=3 times), 912. The executions may occur consecutively (e.g., by default), or spread out over a specified amount of time (e.g., number of hours). During and through the end of script execution, the system captures the monitoring values associated with each attribute of the system at the specified monitoring interval for each attribute, 912.

During the script evaluation stage, any attributes that change during all executions of the script are added to a list of changed attributes. Each changed attribute is evaluated to determine if it has been affected by the script, step 914. For this step, if the value is a metric value, the following process is performed:

(1) Let H=the highest monitoring value recorded for the attribute during the evaluation period and L=the lowest such value.
(2) Calculate difference=abs(H−L)/(max value−min value).
(3) If the difference is greater than or equal to a configurable threshold (default=10%), then the attribute is affected by the script.

For step 914, if the value is a state, the process determines if the new state differs from the old state. If so, it is deemed that the attribute is affected by the script, otherwise it is deemed that the attribute is not affected by the script.

The process 900 then updates the header of the script to add attributes affected by the script and remove any preexisting attributes that were not determined to be affected by the script, step 916.

After the script evaluation phase, process 900 executes an attribute weighting phase (steps 918) to incorporate the weights for the scoring processes described above. One step of this phase is to determine the weight dimensions. In an embodiment, the weight assigned to a given attribute has two dimensions: (1) how much the given attribute is affected by the script, which is referred to as the 'impact value,' and (2) the system impact score (SIS) of the attribute.

With respect to the impact value (i.e., how much an attribute is affected by the script), this calculation depends on the category 806 of the attribute. For metric and ordered value attributes, the impact value is calculated as:

impact value=abs(new value−old value)/(max value−min value).

For unordered lists, the impact value is calculated as:

impact value=a fixed low value(default=10).

The weight for an attribute X is then calculated as the product of the impact value and the SIS, as follows:

Weight($X$)=SIS($X$)*impact_value($X$).

In the attribute weighting phase, the weights are then normalized to add up to 100.

In an embodiment, the script itself can be modified to accommodate changed attributes to the extent that they are affected by the script. For example, the header of the script can be updated to add the weighted attribute or attributes, so that their impact (impact value and SIS) is factored in the script as it is executed.

Figures 10, 11:
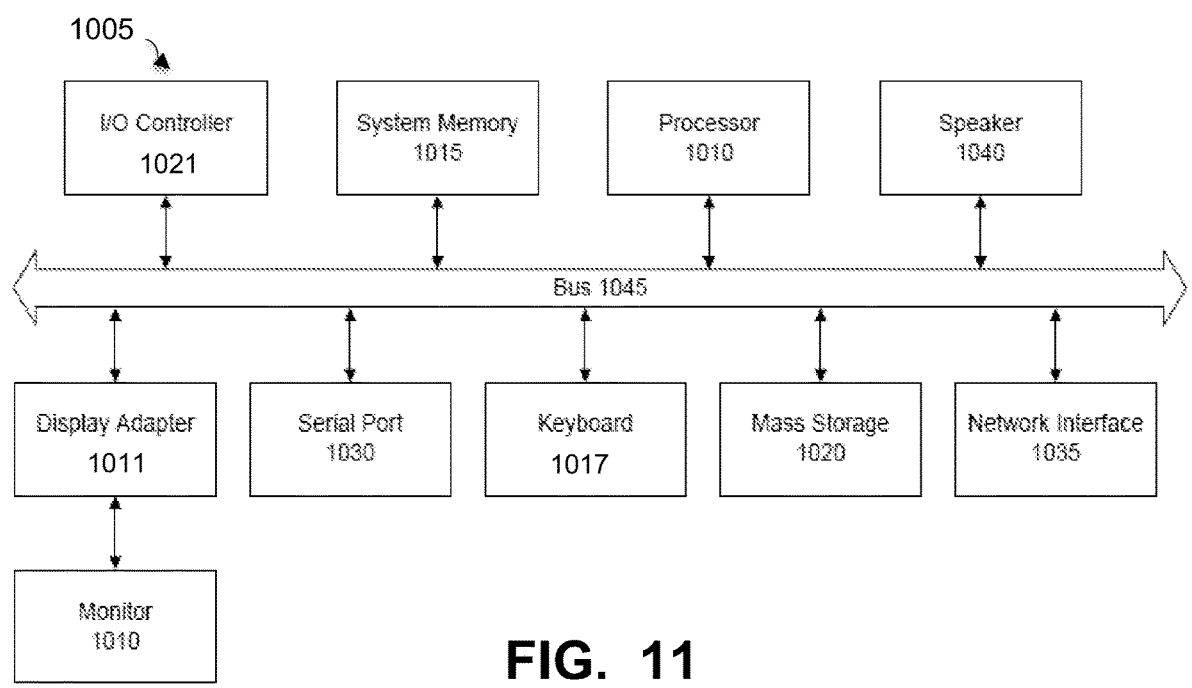
FIG. 10 is a table that shows a selection of attributes of a system and their SIS values, in an example embodiment.
FIG. 11 is a system block diagram of a computer system used to execute one or more software components described herein, under some embodiments.

FIG. 10 is a table 1000 that shows a selection of attributes of a system and their SIS values, in an example embodiment. For the example of FIG. 10, monitoring values are collected across three executions 1052 (denoted R1, R2, R3) of a script (e.g., RunGC.py). The High (H) and Low (L) values are shown for the monitoring values for the selected attributes 1054, which include storage capacity, CPU usage, storage unit count, etc., as shown. In this example, for all metrics the Min value is 0 and the Max value is 100. The storage capacity and CPU usage are considered changed attributes, but the storage unit count attribute is not a changed attribute.

For these example attributes, the impact value is calculated as follows:

Storage Capacity: abs(80−70)/(100−0)>=10%

CPU Usage: abs(97−86)/(100−0)>=10%

Storage Unit Count: abs(32−31)/(100−0)<10%

The weights for each changed attribute, without normalization are:

Storage Capacity: 10*abs(80−70)/(100−0)=100

CPU Usage: 5*abs(97−86)/(100−0)=55

The normalized weights are:

Storage Capacity: (100/(100+55))*100=64.5

CPU Usage: (55/(100+55))*100=35.5

As shown in example table 1000, the outcome of the process 900 is that the header of the script (RunGC.py) is updated to add storage capacity (weight=64.5) and CPU Usage (weight=35.5) as affected attributes.

Embodiments describe a method in which changing the header of a script is used to incorporate weighted attribute values. For these embodiments, the weights are scored directly in the script headers and need to be updated directly there. Although the system 100 can alternatively utilize a separate database where the affected attributes and weights for each script in the script library are maintained, keeping the values within the scripts themselves makes the script library more portable and reduces the need for possibly complicated synchronization processes. For example, a new instance of a PowerProtect Data Manager (PPDM) can point to a given script library and get all the information needed for the SIS value directly or individual scripts can be shared between users. Also, if the script library itself is backed up, individual scripts or the library itself can always be rolled back by restoring older versions of the files, if needed.

The example of score calculations is provided as provided above. That is, once the header is automatically added/updated for a set of scripts by process 900, the SIS value calculation then uses the ZAP formula to decide which of those scripts to run to remediate an issue that occurs.

Using the example from above, the script prior to automatic attribute determination might look like:

RunGC.py:
name: Run GC
author: hpotter
<script content>

Afterwards, the script may look like, where the attributes are added to the script along with the author name and script content:

RunGC.py:
name: Run GC
author: hpotter
attributes: storageCapacity[64.5], cpuUsage[35.5]
<script content>

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

The network of FIG. 1 may comprise any number of individual client-server networks coupled over the Internet or similar large-scale network or portion thereof. Each node in the network(s) comprises a computing device capable of executing software code to perform the processing steps described herein. FIG. 11 shows a system block diagram of a computer system used to execute one or more software components of the systems and methods described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of remediating issues encountered in a data protection system executing a backup, comprising:
   first identifying a plurality of scripts that match an alert message encoding one or more attributes affected by the backup, wherein each script defines attributes reflecting a percentage importance of a corresponding script to resolve a problem causing the alert message;
   second identifying, from the plurality of scripts, a script tagged for automatic evaluation;
   monitoring a state of each attribute to identify one or more attributes affected by the tagged script upon running the tagged script;
   assigning a respective weight to each of the one or more attributes to generate weighted attributes;
   determining a score of the tagged script using the weighted attributes to determine a score ranking relative to other tagged scripts; and
   executing a tagged script with the highest score as the script most likely to remediate an issue causing the alert message.

2. The method of claim 1 wherein the one or more attributes comprise at least one of system storage capacity, processor usage, and storage unit count, and are specified in a configuration file containing information about each attribute comprising: name, description, category, data source for a monitoring value, and a period of the monitoring step.

3. The method of claim 2 wherein the category comprises one of a metric as a scalar value, a state as one of a fixed set of values indicating status, and an ordered value as a set having an inherent increasing value.

4. The method of claim 3 wherein the data source comprises one of an application program interface (API) or a command line interface (CLI).

5. The method of claim 4 wherein the monitoring step comprises:
   calling a specified API or CLI for the monitoring value at an interval corresponding to the period of the monitoring step for a duration of an evaluation process of the tagged script; and
   recording specified outputs in a database.

6. The method of claim 1 further comprising evaluating the tagged script through a process comprising:
   capturing, prior to running the tagged script, a current monitoring value associated with each attribute;
   repeatedly executing the tagged script a defined number of times;
   capturing, during the repeated execution, corresponding monitoring values associated with each attribute at a specified monitoring interval for each attribute;
   adding any attributes that change during all repeated executions to a list of changed attributes; and
   evaluating each attribute in the list of changed attributes to determine if it is affected by the tagged script.

7. The method of claim 6 further comprising updating a header of the tagged script to add each attribute determined to be affected by the tagged script.

8. The method of claim 6 further comprising, for a metric attribute:
   calculating a difference between a high and low value of a recorded monitoring value for a changed attribute during the evaluating step; and
   determining that an attribute is affected in the evaluating step by comparing the difference to a defined threshold value.

9. The method of claim 6 further comprising, for a state attribute: determining if a new state of the attribute is different from a previous state of the attribute during the evaluating step to determine that the attribute is affected in the evaluating step.

10. The method of claim 6 wherein the weight comprises an impact value and a system impact score (SIS) of a respective attribute.

11. The method of claim 10 wherein the weight of the respective attribute comprises a product of the SIS times the impact value, and wherein weights for a plurality of respective attributes are normalized to add up to 100.

12. The method of claim 11 wherein the header is updated to add the normalized weighted value of the respective attributes to the tagged script.

13. The method of claim 1 wherein the plurality of scripts are stored in a script library comprising a private library stored in a network file share (NFS) accessible by the data protection system, and wherein data protection system comprises a deduplicated backup system including a Data Domain file system (DDFS).

14. A method of remediating issues encountered in a data protection system, comprising:
   encoding attributes in an alert message to be generated in the event of attempted execution of a failed backup operation, wherein the attributes represent system resources affected by the backup operation;
   tagging a script of a plurality of scripts stored in a script library for automatic evaluation by a self-healing process of the data protection system wherein, each script defines attributes reflecting a percentage importance of a corresponding script to resolve a problem causing the alert message;

monitoring a state of each attribute during operation of the data protection system;

evaluating the tagged script and using the monitored state of each attribute to identify one or more attributes affected by the tagged script;

weighting each identified attribute; and calculating, using the weighting, a respective score for the tagged script relative to other scripts to determine which script is most likely to remediate an issue causing the alert message.

15. The method of claim 14 wherein the one or more attributes comprise at least one of system storage capacity, processor usage, and storage unit count, and are specified in a configuration file containing information about each attribute comprising: name, description, category, data source for a monitoring value, and a period of the monitoring step.

16. The method of claim 15 wherein the category comprises one of a metric as a scalar value, a state as one of a fixed set of values indicating status, and an ordered value as a set having an inherent increasing value, and wherein the data source comprises one of an application program interface (API) or a command line interface (CLI).

17. The method of claim 14 wherein the weight comprises an impact value and a system impact score (SIS) of a respective attribute, and wherein the weight of the respective attribute comprises a product of the SIS times the impact value, and wherein weights for a plurality of respective attributes are normalized to add up to 100.

18. The method of claim 17 wherein the header of the tagged script is updated to add the normalized weighted value of the respective attributes to the tagged script to determine the respective score.

19. The method of claim 14 further comprising evaluating the tagged script through a process comprising:

capturing, prior to running the tagged script, a current monitoring value associated with each attribute;

repeatedly executing the tagged script a defined number of times;

capturing, during the repeated execution, corresponding monitoring values associated with each attribute at a specified monitoring interval for each attribute;

adding any attributes that change during all repeated executions to a list of changed attributes; and evaluating each attribute in the list of changed attributes to determine if it is affected by the tagged script.

20. A method of remediating issues encountered in a data protection system, comprising:

storing, in a script library, a plurality of scripts configured to resolve a problem causing the alert message, each script comprising an executable program affecting data and resources utilized in a backup operation of the data protection system;

receiving a system alert message encoding one or more attributes affected in the data protection system;

defining the one or more attributes comprising at least one of system storage capacity, processor usage, and storage unit count in a configuration file containing information about each attribute comprising: name, description, category, data source for a monitoring value, and a period of a script monitoring step;

repeatedly running a script tagged to be automatically evaluated to determine which of the one or more attributes are affected by the script to score the script relative to other scripts of the script library; and determining a relative weight to assign to each of the one or more attributes to help select a script most likely to remediate an issue causing the alert message.

* * * * *